US012711139B2

(12) United States Patent
Stewart et al.

(10) Patent No.: US 12,711,139 B2
(45) Date of Patent: Aug. 18, 2026

(54) SYSTEMS AND METHODS FOR A GENERATIVE ARTIFICIAL INTELLIGENCE MODEL WITH CONFIDENCE INDICATION

(71) Applicant: Wells Fargo Bank, N.A., San Francisco, CA (US)

(72) Inventors: Bradley Stewart, San Francisco, CA (US); Shobha Duggirala, San Francisco, CA (US); Amruth Kumar, San Francisco, CA (US); Antonio Iniguez, San Francisco, CA (US); Jazz Samra, San Francisco, CA (US); Ashish B. Kurani, Hillsborough, CA (US); Priyanka Khanna, San Francisco, CA (US); Cleane Sakaguti, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/443,190

(22) Filed: Feb. 15, 2024

(65) Prior Publication Data

US 2025/0265252 A1 Aug. 21, 2025

(51) Int. Cl.
*G06F 16/2457* (2019.01)

(52) U.S. Cl.
CPC .. *G06F 16/24575* (2019.01); *G06F 16/24578* (2019.01)

(58) Field of Classification Search
None
See application file for complete search history.

(56) References Cited

U.S. PATENT DOCUMENTS

| | | | | |
|---|---|---|---|---|
| 9,961,204 | B1 | 5/2018 | Moran et al. | |
| 11,755,977 | B2 * | 9/2023 | Doyle | G06Q 40/03 705/38 |
| 2020/0226135 | A1 * | 7/2020 | Frost | G06N 5/04 |
| 2020/0293608 | A1 | 9/2020 | Nelson et al. | |
| 2021/0182798 | A1 | 6/2021 | Bikumala et al. | |
| 2021/0281683 | A1 | 9/2021 | Miller | |
| 2022/0147898 | A1 * | 5/2022 | Gaurav | G06Q 50/18 |
| 2022/0366354 | A1 | 11/2022 | Maiman et al. | |
| 2022/0398249 | A1 * | 12/2022 | Scott | G06F 16/24535 |

* cited by examiner

*Primary Examiner* — Thu N Nguyen
(74) *Attorney, Agent, or Firm* — Foley & Lardner LLP

(57) ABSTRACT

A provider computing system can include at least one processing circuit having at least one processor coupled to at least one memory device. The memory device can store instructions that, when executed by the at least one processor, cause the at least one processing circuit to receive a query corresponding to a first topic, determine one or more data sources associated with the first topic based on data included in the query, generate a first response to the query based on information received from the one or more data sources using a machine learning model, determine a correlation between the first response and the information received from the one or more data sources, generate a first score for the first response based on the correlation, and transmit one or more signals to cause the user device to display a user interface including the first response and the first score.

17 Claims, 6 Drawing Sheets

SYSTEMS AND METHODS FOR A GENERATIVE ARTIFICIAL INTELLIGENCE MODEL WITH CONFIDENCE INDICATION

TECHNICAL FIELD

The present disclosure relates generally to generative artificial intelligence (AI), more specifically to systems, computer-readable media, and apparatuses for confidence indication of a generative AI model.

BACKGROUND

Artificial intelligence (AI) models may be used to provide information to a user. More specifically, AI models may provide content that pertains to a user based on user information.

SUMMARY

One embodiment relates to a provider computing system including at least one processing circuit having at least one processor coupled to at least one memory device. The at least one memory device can store instructions that, when executed by the at least one processor, cause the at least one processing circuit to receive, from a user device, a query corresponding to a first topic. The instructions can also cause the at least one processing circuit to determine, responsive to receipt of the query, one or more data sources associated with the first topic based on data included in the query. The instructions can also cause the at least one processing circuit to generate, using a machine learning model, a first response to the query based on information received from the one or more data sources. The instructions can also cause the at least one processing circuit to determine, responsive to evaluation of the first response, a correlation between the first response and the information received from the one or more data sources. The instructions can also cause the at least one processing circuit to generate a first score for the first response based on the correlation, the first score to indicate a confidence of the first response. The instructions can also cause the at least one processing circuit to transmit one or more signals to cause the user device to display a user interface including the first response and the first score.

Another embodiment relates to a method. The method can include receiving, by a provider computing system from a user device, a query corresponding to a first topic. The method can also include determining, by the provider computing system responsive to receipt of the query, one or more data sources associated with the first topic based on data included in the query. The method can also include generating, by the provider computing system using a machine learning model, a first response to the query based on information received from the one or more data sources. The method can also include determining, by the provider computing system responsive to evaluation of the first response, a correlation between the first response and the information received from the one or more data sources. The method can also include generating, by the provider computing system, a first score for the first response based on the correlation, the first score to indicate a confidence of the first response. The method can also include transmitting, by the provider computing system, one or more signals to cause the user device to display a user interface including the first response and the first score.

Still another embodiment relates to a non-transitory computer-readable storage media having instructions stored thereon that, when executed by at least one processor of a provider computing system, cause the provider computing system to performing operations including: receiving, from a user device, a query corresponding to a first topic; determining, responsive to receipt of the query, one or more data sources associated with the first topic based on data included in the query; generating, using a machine learning model, a first response to the query based on information received from the one or more data sources; determining, responsive to evaluation of the first response, a correlation between the first response and the information received from the one or more data sources; generating a first score for the first response based on the correlation, the first score to indicate a confidence of the first response; and transmitting one or more signals to cause the user device to display a user interface including the first response and the first score.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements. Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

BRIEF DESCRIPTION OF THE FIGURES

These and other aspects and features of the present implementations are depicted by way of example in the figures discussed herein. Present implementations can be directed to, but are not limited to, examples depicted in the figures discussed herein. Thus, this disclosure is not limited to any figure or portion thereof depicted or referenced herein, or any aspect described herein with respect to any figures depicted or referenced herein.

DETAILED DESCRIPTION

Figure 1:
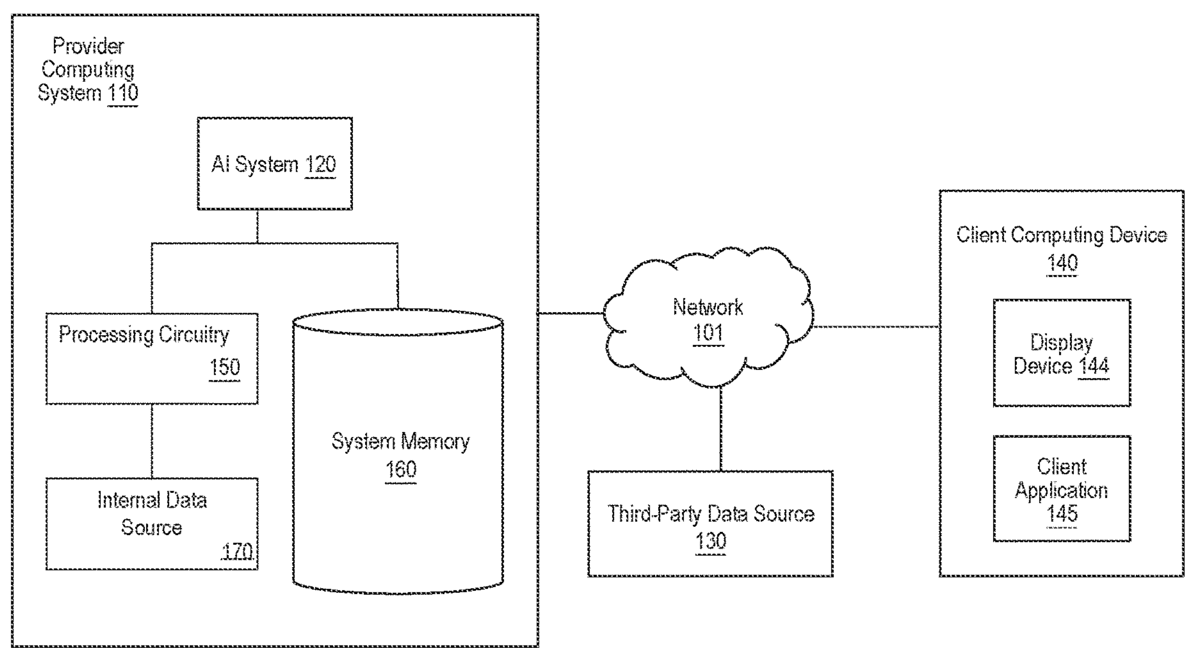
FIG. 1 depicts a block diagram of a system to provide scores associated with one or more responses, according to an example embodiment.

Aspects of this technical solution are described herein with reference to the figures, which are illustrative examples of this technical solution. The figures and examples below are not meant to limit the scope of this technical solution to the present implementations or to a single implementation, and other implementations in accordance with present implementations are possible, for example, by way of interchange of some or all of the described or illustrated elements. Where certain elements of the present implementations can be partially or fully implemented using known components, only those portions of such known components that are necessary for an understanding of the present implementations are described, and detailed descriptions of other portions of such known components are omitted to not obscure the present implementations. Terms in the specification and claims are to be ascribed no uncommon or special meaning unless explicitly set forth herein.

The systems, methods, computer-readable media, and apparatuses described herein relate to an artificial intelligence system, and particularly a generative artificial intelligence system, configured or structured to provide at least one confidence indication of one or more outputs of the generative artificial intelligence system. For example, confidence indications may be provided as numeric values (e.g., 0-100), alpha values (e.g., A-F), alpha-numeric, color coded (e.g., indicators by the responses, different color fonts included in a response), icon-based (e.g., smiley face, sad face), a combination thereof, and/or other possible indications.

According to various embodiments described herein, the systems, methods, and computer-readable media described herein relate to a technical solution of using a generative AI model to generate and provide at least one confidence indication. The generative AI model may determine correlations between information used to generate responses (e.g., outputs) and the responses to determine a confidence, which may be expressed as a numerical score, in the response(s). The generative AI model may provide content that provides indications of the confidence in the responses. For example, the generative AI model may generate and provide a user interface that includes elements to display confidence indications.

The systems, methods, and computer-readable media described herein offer technical improvements to existing AI systems. For example, by providing a confidence indication of responses generated by one or more models a user or computing device viewing the response(s) may be assured as to an accuracy of the response. In this way, a user may be assured or substantially assured as to the accuracy of the responses as the user is provided with a response as well as a confidence indication of the response. By providing a confidence indication alongside the responses, occurrences of implementing and/or using information that resulted from model hallucinations may be prevented or reduced as responses that may be inaccurate can be accompanied with a corresponding confidence indication/score that indicates that the response is inaccurate. Additionally, the AI model may receive indications of given information or given data sources to use when generating responses and the AI model can filter the responses based on the identified information. Implementation of confidence scores for generated responses may assist in improving an accuracy or credibility of responses that are output by AI models as the AI models may generate multiple responses and one or more of the responses may be selected for output based on corresponding confidence scores thereby leading to improved accuracy of provided responses. These and other features and benefits are described more fully herein.

FIG. 1 depicts a block diagram of a system 100 to provide confidence indications for responses generated by an artificial intelligence (AI) system, according to an example embodiment. As illustrated by way of example in FIG. 1, the system 100 can include at least a network 101, a provider computing system 110 having an AI system 120, a third-party data source 130, and a client computing device 140. The network 101 may communicably couple the components and/or systems to each other. As described herein, the provider computing system 110 may receive inputs (e.g., prompts, responses, information, data, credentials, selections) from a user via a user interface (e.g., a user interface of a display device 144) of the client computing device 140. The provider computing system 110 may query/retrieve/obtain information from one or more data sources (e.g., the third-party data source 130, an internal data source 170) associated with a user (e.g., transaction history, financial information, learning metrics, device interactions) and may generate one or more scores based on the reliability of the data sources and/or information provided by the data sources.

The network 101 can include any type or form of one or more networks. The geographical scope of the network 101 can vary widely and the network 101 can include a local-area network (LAN), e.g., Intranet, a metropolitan area network (MAN), a wide area network (WAN), or the Internet. The topology of the network 101 can be of any form and can include, e.g., any of the following: point-to-point, bus, star, ring, mesh, or tree. The network 101 can include an overlay network which is virtual and sits on top of one or more layers of other networks. The network 101 can be of any such network topology as known to those ordinarily skilled in the art capable of supporting the operations described herein. The network 101 can utilize different techniques and layers or stacks of protocols, including, e.g., the Ethernet protocol, the Internet protocol suite (TCP/IP), the ATM (Asynchronous Transfer Mode) technique, the SONET (Synchronous Optical Networking) protocol, or the SD (Synchronous Digital Hierarchy) protocol. The TCP/IP Internet protocol suite can include application layer, transport layer, Internet layer (including, e.g., IPv6), or the link layer. The network 101 can include a type of a broadcast network, a telecommunications network, a data communication network, or a computer network.

The provider computing system 110 is owned by, associated with, or otherwise operated by a provider institution (e.g., a bank or other financial institution) that maintains one or more accounts held by various customers (e.g., the customer/user associated with the client computing device 140), such as demand deposit accounts, credit card accounts, receivables accounts, and so on. In some instances, the provider computing system 110 may include one or more servers, each with one or more processing circuits having one or more processors configured to execute instructions stored in one or more memory devices to send and receive data stored in the one or more memory devices and perform other operations to implement the features, methods, and operations described herein. In the example shown, the provider computing system 110 includes an AI system 120, a processing circuitry 150, a system memory 160, and an internal data source 170.

The AI system 120 may include one or more servers, databases, or cloud computing environments that may execute one or more generative AI models. The generative AI models may include, but are not limited to, large language models (LLMs), which can be trained to generate human-like text, speech, images, and/or components of graphical user interfaces. The generative AI models may be structured using a deep learning architecture that includes a multitude of interconnected layers, including attention mechanisms, self-attention layers, and transformer blocks. The generative AI models can be trained on large datasets to assimilate patterns, structures, and relationships within the data. The trained generative AI models can be trained to generate outputs that resemble or closely resemble the characteristics of a user and/or an event that pertains to the user. The generative AI models may be fine-tuned to generate specific output data, including data that is compatible with various database architectures or provider computing systems. The generative AI models can be trained via optimization of a large number of parameters, in which the generative AI models learn to minimize the error between its predictions and the actual data points, resulting in highly accurate and coherent generative capabilities. In some embodiments, the AI system 120 may include at least one of a Large Language Model, a generative pre-trained transformer, or a generative artificial intelligence model. For example, the AI system 120 may include and/or be implemented as a generative AI model.

The AI system 120 may include at one or more Machine Learning models or Artificial Intelligence models. For example, the AI system 120 may include regression trees, deep neural networks, supervised learning model, unsupervised learning models, nearest neighbor, generative adversarial (GANs), stable diffusers, generative artificial intelligence (GAI), transformers, or many other types of models. The AI system 120 may be trained to detect correlations between events that impact users accounts. For example, the AI system 120 may be trained to detect correlations between declined transaction requests. As another example, the AI system 120 may be trained to detect correlations between opening accounts. The AI system 120 may be tested and/or processed to determine that the AI system 120 is ready to be implemented. For example, the AI system 120 may be configured to identify repetitive prompts with similar information. To continue this example, the AI system 120 may be ready for implementation responsive to the AI system 120 providing repetitive responses to similar or identical prompts.

The processing circuitry 150 includes one or more processing circuits including one or more processors coupled to one or more memory devices. The processing circuitry 150 can include, but is not limited to, at least one microcontroller unit (MCU), microprocessor unit (MPU), central processing unit (CPU), graphics processing unit (GPU), physics processing unit (PPU), embedded controller (EC), and/or the like. The processing circuitry 150 can include a memory (such as system memory 160, or memory 160) operable to store or storing one or more instructions for operating components of the processing circuitry 150 and operating components operably coupled to the processing circuitry 150. For example, the one or more instructions can include one or more of firmware, software, hardware, operating systems, embedded operating systems. The memory 160 may include one or more devices (e.g., RAM, ROM, Flash memory, hard disk storage) for storing data and/or computer code for completing and/or facilitating the various processes described herein. The memory 160 may include non-transient volatile memory, non-volatile memory, and non-transitory computer storage media, database components, object code components, script components, or any other type of information structure for supporting the various activities and information structures described herein. The processing circuitry 150 or the provider computing system 110 generally can include one or more communication bus controllers to effect communication between the processing circuitry 150 and the other elements of the provider computing system 110.

According to some exemplary embodiments, the provider computing system 110 may comprise an interface controller. The interface controller may be a controller structured or configured to link the provider computing system 110 with one or more of the network 101, the client computing device 140, and the third-party data source 130, by one or more communication interfaces. A communication interface can include, for example, an application programming interface ("API") compatible with a particular component of the provider computing system 110, the client computing device 140, or the third-party data source 130. The communication interface can provide a particular communication protocol compatible with a particular component of the provider computing system 110 and a particular component of the client computing device 140 or the third-party data source 130. The interface controller can be compatible with particular content objects and can be compatible with particular content delivery systems corresponding to particular content objects, structures of data, types of data, or any combination thereof. For example, the interface controller can be compatible with transmission of video content, audio content, image data, or any combination thereof.

The system memory 160 can store data associated with the provider computing system 110. The system memory 160 can include one or more hardware memory devices to store binary data, digital data, or the like. The system memory 160 can include one or more electrical components, electronic components, programmable electronic components, reprogrammable electronic components, integrated circuits, semiconductor devices, flip flops, arithmetic units, or the like. The system memory 160 can include at least one of a non-volatile memory device, a solid-state memory device, a flash memory device, or a NAND memory device. The system memory 160 can include one or more addressable memory regions disposed on one or more physical memory arrays. A physical memory array can include a NAND gate array disposed on, for example, at least one of a particular semiconductor device, integrated circuit device, and printed circuit board device.

The third-party data source 130 or computing system may be associated with a third-party (e.g., owned by, operated by, managed by, and/or otherwise associated with the third-party). The third-party may be an entity that is a third-party relative to the provider entity/institution. While only one third-party data source is depicted, it should be appreciated that multiple third-parties can be included in the system 100 and coupled, via the network 101, to the provider computing system 110. The third-party data source 130 can be a cloud system, a server, a distributed remote system, or any combination thereof. As another example, the third-party data source 130 can include an operating system configured to execute a virtual environment. The operating system can include hardware control instructions and program execution instructions. The operating system can include a high-level operating system, a server operating system, an embedded operating system, or a boot loader.

The client computing device 140 is owned, operated, controlled, managed, and/or otherwise associated with a user. In this example, the user is a customer of the provider institution. In some embodiments, the client computing device 140 may be or may comprise, for example, a desktop or laptop computer (e.g., a tablet computer), a smartphone, a wearable device (e.g., a smartwatch), a personal digital assistant, and/or any other suitable computing device. In the example shown, the client computing device 140 is structured as a mobile computing device, namely a smartphone. The client computing device 140 can communicate with the provider computing system 110 by the network 101 via one or more communication protocols therebetween.

The client computing device 140 can include one or more I/O devices, a network interface circuit, at least one processing circuit, and various other components and/or systems. The client computing device 140 is shown to include an I/O device as a display device 144. While the term "I/O" is used, it should be understood that the I/O devices may be input-only devices, output-only devices, and/or a combination of input and output devices. In some instances, the I/O devices include various devices that provide perceptible outputs (such as display devices with display screens and/or light sources for visually perceptible elements, an audio speaker for audible elements, and haptics or vibration devices for perceptible signaling via touch, etc.), that capture ambient sights and sounds (such as digital cameras, microphones, etc.), and/or that allow the user to provide inputs (such as a touchscreen display, stylus, keyboard, force sensor for sensing pressure on a display screen. The I/O devices can include a display configured to present a user interface or graphical user interface. The I/O devices can output at least one or more user interface presentations and control affordances. The I/O devices can generate any physical phenomena detectable by human senses, including, but not limited to, one or more visual outputs, audio outputs, haptic outputs, or any combination thereof.

The client computing device 140 can include a display device 144. The display device 144 can display at least one or more user or graphical user interfaces. The display device 144 can include, for example, a liquid crystal display (LCD), a light-emitting diode (LED) display, an organic light-emitting diode (OLED) display, or the like. The display device 144 can receive, for example, capacitive or resistive touch input.

The client computing device 140 is also shown to include a client application 145. The client application 145 may be a financial institution banking application provided by and/or at least partly supported by the provider computing system 110 (thus, the client application 145 may be structured as a mobile banking application with various functionalities associated therewith among other functionalities described herein). In some instances, the client application 145 is coupled to the provider computing system 110 and may enable account management regarding one or more accounts held at the provider institution associated with the provider computing system 110 (e.g., funds transfers, bill payment). In some instances, the client application 145 provided by the provider computing system 110 incorporates various functionality provided by or otherwise enabled by the provider computing system 110 (e.g., initiating and/or approving transfers) using one or more application programming interfaces (APIs) and/or software development kits (SDKs) provided by the provider computing system 110. Accordingly, the client application 145 is structured to provide the user with access to various services offered by the provider institution.

The client computing device 140 may execute the client application 145, to provide the user with access to the client application 145 on the client computing device 140. In some embodiments, the client application 145 is hard coded into the memory of the client computing device 140. For example, a user of the client computing device 140 may download the client application 145 and install the client application 145 locally on the client computing device 140. Thus, the client application 145 may be executed or run by one or more processors of the client computing device 140. In some embodiments, the client application 145 is a web-based interface application, where the user logs into or otherwise accesses the web-based interface before usage. In such embodiments, the application may be supported by a separate computing system including one or more servers, processors, network interface circuits, or the like (e.g., the provider computing system 110), that transmit the application data for use to the client computing device 140.

Figure 2:
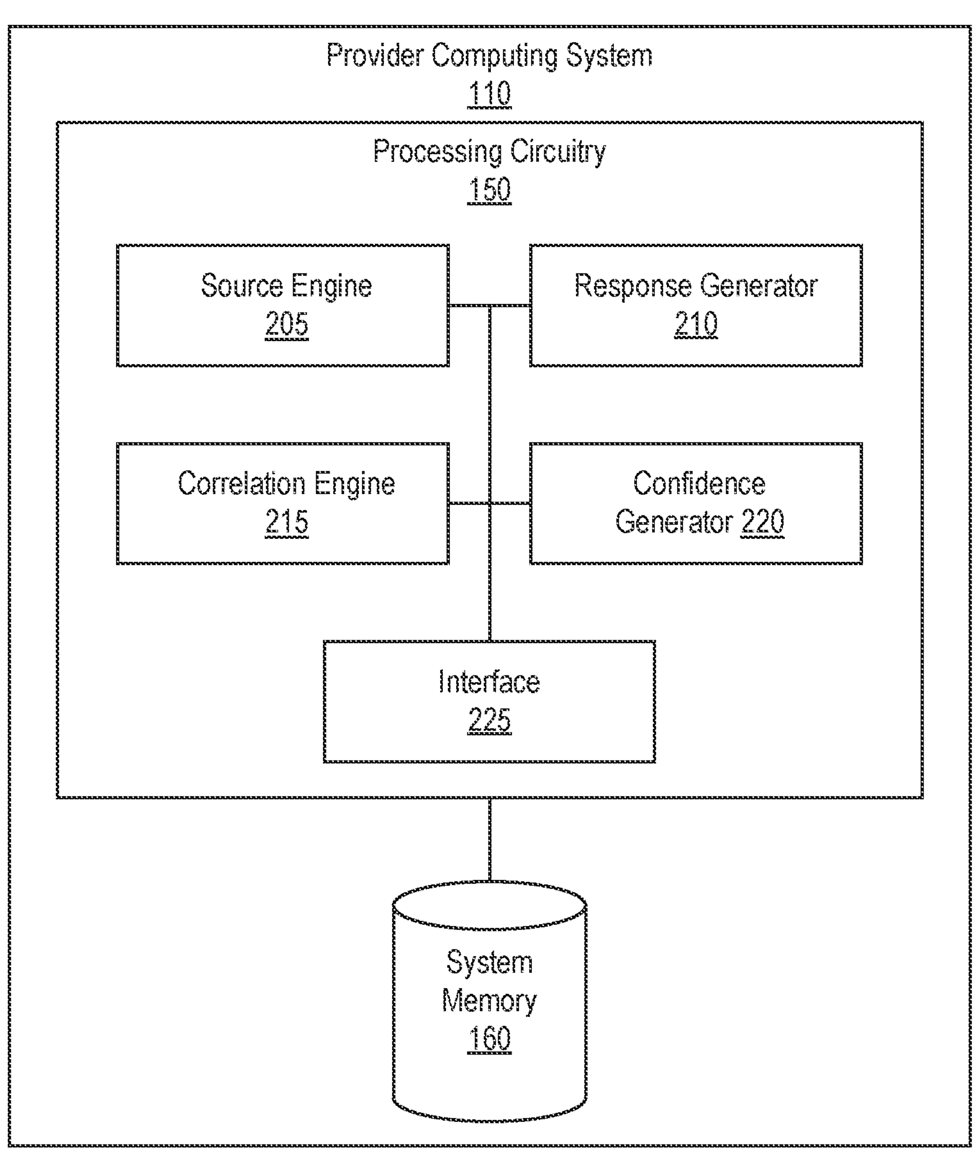
FIG. 2 depicts a provider computing system included in the system illustrated in FIG. 1, according to an example embodiment.

FIG. 2 depicts, in greater detail, the provider computing system 110 of the system 100 of FIG. 1, according to an example embodiment. In some embodiments, the processing circuitry 150 may include a source engine 205, a response generator 210, a correlation engine 215, a confidence generator 220, and an interface 225. In some embodiments, the various components and/or devices of the processing circuitry 150 may be stored in the system memory 160. For example, the source engine 205 may be stored in the system memory 160 as program code, instructions, firmware, and/or executable code. In some embodiments, the system memory 160 may store instructions that cause the processing circuitry 150 to perform the various processes and/or steps described herein. In some embodiments, the system memory 160 may store the various types of information described herein. For example, the system memory 160 may store transaction information that pertains to one or more users.

While the processing circuitry 150 is shown to include multiple components, the components, as shown in FIG. 2, may be arranged and/or organized as separate circuits. For example, the correlation engine 215 may be a circuit that includes memory having instructions that cause a processor to perform the functionality of the correlation engine 215. Stated otherwise, the correlation engine 215 may include a correlation engine circuit separate from the processing circuitry 150. As another example, at least one of the source engine 205, the response generator 210, or the confidence generator 220 may be a circuit that includes memory having instructions that cause a processor to perform the functionality of the associated device or component.

Referring to FIG. 1 and FIG. 2, in some embodiments, the interface 225 may communicate with, interface with, and/or otherwise interact with the various systems, devices, and/or components of the system 100. For example, the interface 225 may communicate with the client computing device 140. In some embodiments, the interface 225 may include at least one communication device. For example, the interface 225 may include a transceiver. In some embodiments, the interface 225 may include at least one of the interface controller, the communication interface, and/or the various communication devices described herein.

In some embodiments, the interface 225 may receive one or more queries. For example, the interface 225 may receive one or more queries from the client computing device 140. In some embodiments, the interface 225 may receive the queries responsive to a user interacting with and/or interfacing with the client computing device 140. For example, the interface 225 may receive the queries responsive to the user selecting an icon that is included in a user interface displayed by the display device 144. In some embodiments, the queries may correspond to one or more topics. For example, a first query may correspond to a first topic. In some embodiments, the topics may refer to and/or include at least one of an area of interest, a question, a subject, a category, and/or a focus area. For example, a first topic may correspond to guidelines for reporting updates to a software application. As another example, a second topic may correspond to how to format a document to conform with predetermined standards.

In some embodiments, the interface 225 may provide the query and/or information that corresponds to the query to one or more components of the system 100. For example, the interface 225 may provide the query to the source engine 205. In some embodiments, the source engine 205 may determine one or more data sources. For example, the source engine 205 may determine data sources that correspond to one or more queries. In some embodiments, the source engine 205 may determine data sources that are associated with topics based on data included in the queries. For example, the source engine 205 may determine data sources that are associated with a first topic based on data included in a first query. In some embodiments, the data sources may include the third-party data source 130, the internal data source 170, and/or one or more external or remote databases.

In some embodiments, the response generator 210 may generate one or more responses. For example, the response generator 210 may generate responses to the queries. In some embodiments, the response generator 210 may generate responses based on information received from one or more data sources. For example, the response generator 210 may generate responses based on information received from the internal data source 170. In some embodiments, the response generator 210 may receive information by initiating a request to a data source identified by the source engine 205. The request may include an identification of given types of information or given contexts of information. The response generator 210 may generate a response based on information received from the data source. In some embodiments, the response generator 210 may communicate with the correlation engine 215 responsive to generating one or more responses.

In some embodiments, the correlation engine 215 may determine one or more correlations. For example, the correlation engine 215 may determine correlations between responses and information received from the data sources. Stated otherwise, the correlation engine 215 may determine relationships between the generated responses and the data used to generate the responses. In some embodiments, the correlation engine 215 may determine correlations by identifying or detecting given portions of the information that were used by the response generator 210 in generating the responses. For example, the response generator 210 may have received information that included a first portion and a second portion. To continue this example, the correlation engine 215 may determine that the response generator 210 used the first portion to generate a first response. In some embodiments, the correlation engine 215 may also determine or identify one or more data sources that provided or included the information. For example, the correlation engine 215 may determine a given data source that provided a given portion of the information used by the response generator 210.

In some embodiments, the correlation engine 215 may provide or communicate the correlations to the confidence generator 220. For example, the correlation engine 215 may identify which data sources were used by the response generator 210 to generate responses. As another example, the correlation engine 215 may indicate that the response generator 210 generated one or more responses without using information provided by the data sources. In some embodiments, the confidence generator 220 may generate one or more scores. For example, the confidence generator 220 may generate scores to indicate a confidence of one or more responses. In some embodiments, the confidence generator 220 may implement retrieval augmented generation to generate the scores. For example, the confidence generator 220 may detect an identification of the data sources and determine a reliability of the data sources. As another example, the confidence generator 220 may determine a percentage and/or amount of external information used to generate one or more responses. To continue this example, the confidence generator 220 may determine one or more scores based on an amount of information used by external data sources.

In some embodiments, the confidence generator 220 may generate the scores by determining which data sources were used and how much of the data was used by the response generator 210 in generating the responses. For example, the confidence generator 220 may generate a first score for a first response based on the response generator 210 having used a first data source and a first portion of the information provided by the first data source. In some embodiments, a higher or larger number may be associated with higher confidence levels. In other embodiments, various numbers or values may be associated with higher confidence.

In some embodiments, the confidence generator 220 may implement at least one of one Natural Language Processing (NLP), Machine Learning Algorithms, Fact-checking Algorithms, Sentiment Analysis, Anomaly Detection Models, Statistical Methods, Collaborative Filtering, and/or blockchain when generating scores and/or determining confidence of responses. For example, the confidence generator 220 may implement NLP techniques to evaluate textual data included in a response. To continue this example, the confidence generator 220 may determine, based on the evaluation of textual data, a context of the textual data included in responses. As another example, the confidence generator 220 may implement Fact-Checking Algorithms to compare and/or cross-reference information across one or more data sources. To continue this example, the confidence generator 220 may cross-reference information included with a first source against information included with a second source.

In some embodiments, the confidence generator 220 may retrieve, access, and/or implement one or more sets of information to generate confidence scores. For example, the confidence generator 220 may retrieve information from the system memory 160 to generate confidence scores. In this example, the confidence generator 220 may compare known information (e.g., information stored in the system memory 160) with information used to generate one or more responses. To continue this example, the system memory 160 may include information that is known to be true or factual (e.g., labeled, tagged, or otherwise identified to include trusted information) and the confidence generator 220 may compare this information with information used to generate the responses. In this example, the known information may include information that identifies a factual answer to a query and the confidence generator 220 may compare the factual answer with the information used to generate the response. To continue this example, the confidence generator 220 may generate confidence scores based on variances and/or differences between the information (e.g., differences between the information stored in the system memory 160 and the information used to generate the responses).

In some embodiments, the confidence generator 220 may access and/or retrieve external information to generate one or more confidence scores. For example, the confidence generator may transmit, via the interface 225, one or more API calls to an external database (e.g., the third-party data source 130, remote server, etc.) to retrieve and/or access one or more sets of information. In this example, the confidence generator 220 may compare the information, retrieved via the API calls, with information used to generate the responses. To continue this example, the information retrieved via the API calls may include information that is known to be factual, based on the source of the information, and this factual information may be compared to the information used to generate the responses. In this example, the source may be a given, tagged, or specific entity that is known to have factual information associated with a given query. For instance, assuming a query pertains to weather, the source from which factual information is retrieved may be the National Weather Service (NWS). Continuing the above example, the confidence generator 220 may compare the factual information (e.g., retrieved from a third-party source) with information used to generate the responses. To continue this example, the confidence generator 220 may generate confidence scores based on variances and/or differences between the retrieved information (e.g., the information retrieved with the API calls), and the information used to generate the responses.

In some embodiments, the confidence generator 220 may generate confidence scores based on indications provided by one or more computing devices. For example, the confidence generator 220 may provide, via the interface 225, one or more generated responses to a computing device and/or a user device (e.g., the client computing device 140). To continue this example, the confidence generator 220 may prompt the client computing device 140 to provide an indication as to the accuracy or correctness of the responses. In this example, the response generator 210 may generated one or more confidence scores based on one or more indications provided by the client computing device 140.

The confidence generator 220 may perform one or more steps or actions to calculate or determine the confidence scores. The confidence generator 220 may be configured to calculate or determine confidence scores, based on a difference between factual information and information used to generate responses. In some embodiments, the confidence generator 220 may be configured to compute confidence scores to increase (or decrease) as the difference between factual information and information used to generate responses decreases (or increases). For example, the confidence generator 220 may retrieve factual or accurate information. To continue this example, the confidence generator 220 may determine differences or variances between the factual information and information used to generate the responses. In this example, the confidence generator 220 may determine a confidence score for a response generated by the response generator 210. The response may be a response to a query. In this example, the query may have asked "what is the correct format to use when creating a document to file with a given entity." In this example, the confidence generator 220 may retrieve information, from the given entity, and compare the retrieved information with information, used by the response generator 210, in generating the response. To continue this example, the confidence generator 220 may take the information, retrieved from the given entity, to be factual given that the source of the information was the given entity.

In some embodiments, the response generator 210 may generate response based on information provided by one or more sources. For example, the response generator 210 may generate a first response using information provided by a first source. In this example, the first source may have a high reliability level based on the first source having a given tag or a given reliability level. To continue this example, the response generator 210 may generate the first response using information provided by the first source. In this example, confidence generator 220 may determine a score for the response generated by the response generator 210 based on the reliability of the data source and/or how much of the information that the response generator 210 used in generating the response.

In some embodiments, the interface 225 may transmit signals to cause one or more devices to display a user interface. For example, the interface 225 may transmit signals to the client computing device 140. In some embodiments, the interface 225 may transmit signals that cause the display device 144 to display one or more user interfaces. The interfaces may include one or more responses and/or one or more scores. For example, the interfaces may include responses generated by the response generator 210 and/or scores generated by the confidence generator 220.

In some embodiments, the source engine 205 may identify one or more data sources. For example, the interface 225 may receive a query that includes and/or indicates a data source. To continue this example, the source engine 205 may identify the data source that was included in the query. In some embodiments, the source engine 205 may identify information that was included in one or more queries. For example, the interface 225 may receive a query that includes information provided by a user. To continue this example, the query may include a question and then provide one or more sets of information to user when generating a response to the question.

In some embodiments, the interface 225 may interface with one or more data sources based on information provided by a user. For example, the interface 225 may interface with data sources that were identified as being associated with the queries. As another example, the interface 225 may interface with data sources that were identified by the client computing device 140. In some embodiments, a user may enter information to identify the data sources. For example, the user may enter a name of an online publication source. As another example, the data source may be a user manual and the user may enter or provide the user manual.

In some embodiments, the interface 225 may provide, responsive to interfacing with the identified data sources, data that is associated with the query. For example, the interface 225 may provide the data to the response generator 210. In some embodiments, the response generator 210 may generate one or more responses based on the data provided by the interface 225. In some embodiments, the response generator 210 may use given data sources to generate one or more responses. For example, a user may enter or indicate, via a user interface, a given data source and/or data type. To continue this example, the response generator 210 may generate one or more responses using information obtained from the given data source or data type (e.g., a data source identified by a user).

In some embodiments, the source engine 205 may identify data sources based one or more credentials. For example, the source engine 205 may identify data sources based on a credential of a user associated with the client computing device 140. In some embodiments, the source engine 205 may identify one or more data sources based on the credential. For example, a first data source may be included in a subscription service and the source engine 205 may identify the first data source based on the credential including a subscription to the subscription service. In some embodiments, the source engine 205 may identify one or more data sources that are accessible based on the credential.

In some embodiments, the source engine 205 may provide credential specific information to the response generator 210. For example, the source engine 205 may provide information that identified based on the credential. In some embodiments, the response generator 210 may generate one or more responses based on the credential specific information.

In some embodiments, the response generator 210 may generate one or more responses to a first query. For example, the response generator 210 may generate a first response and a second response to a first query. In some embodiments, the first response and the second response may be generated using one or more subsets of information. For example, the first response may be generated using a first subset of information and the second response may be generated using a second subset of information. To continue this example, the first subset of information and the second subset of information may include overlapping information, similar information, different information, and/or identical information.

In some embodiments, the correlation engine 215 may determine correlations between the responses and information received from the data sources. For example, the correlation engine 215 may determine correlations between a first response and information used to generate the first response. As another example, the correlation engine 215 may determine correlations between a second response and information used to generate the second response. In some embodiments, the correlation engine 215 may determine correlations by determining a contribution or a utilization of information, by the response generator 210, when generating responses. For example, the correlation engine 215 may determine a percentage of a given response that was generated based on one or more sets of information. As another example, the correlation engine 215 may determine how much of the information, used to generate responses, is reflected in the response. Stated otherwise, the correlation engine 215 may determine if given responses incorporated retrieved information.

In some embodiments, the correlation engine 215 may determine correlations based on responses generated by the response generator 210. For example, the correlation engine 215 may receive, from the response generator 210, information that was used to generate a given response. In this example, the correlation engine 215 may evaluate the given response to identify one or more portions of the given response that reflect the information. Stated otherwise, the correlation engine 215 may determine how much of the information, used by the response generator 210, to generate the given response is reflected within the given response. As another example, the correlation engine 215 may determine that portions of the response were missing or absent from the information (e.g., the response generator 210 created or generated these portions). In some embodiments, the correlations may indicate or represent a percentage or a value. For example, a first correlation may include a first value and a second correlation may be a second value. The first value and the second value may indicate how much information, used by the response generator 210, is reflected in the responses generated by the response generator 210.

In some embodiments, the confidence generator 220 may generate scores for the multiple responses. For example, the confidence generator 220 may generate a first score for a first response and a second score for a second response. In some embodiments, the confidence generator 220 may select one or more responses based on the generated scores. For example, the confidence generator 220 may select a first response, instead of a second response, based on the first response having a higher score. In some embodiments, the confidence generator 220 may generate one or more scores based on a reliance and/or a reliability of the data sources. For example, the confidence generator 220 may generate a first score for one or more responses generated using information with a first reliability score. As another example, the confidence generator 220 may generate a second score for one or more responses generated using information with a second reliability score.

In some embodiments, the various components of the processing circuitry 150 may implement and/or utilize the AI system 120 to perform one or more of the various operations described herein. For example, the correlation engine 215 may implement the AI system 120 to determine one or more correlations. As another example, the response generator 210 may implement the AI system 120 to generate one or more responses. In some embodiments, the AI system 120 may include at least one of a Large Language Model, a generative pre-trained transformer, or a generative artificial intelligence model. For example, the AI system 120 may include and/or be implemented as a generative AI model.

As described herein, the provider computing system 110 may generate, provide, present, and/or otherwise display one or more user interfaces. For example, the provider computing system 110 may transmit, to the client computing device 140, signals that cause the client computing device 140 to display one or more user interfaces. In some embodiments, the user interfaces may display and/or include the various types of information described herein. For example, the user interfaces may display the responses generated by the response generator 210. As another example, the user interfaces may display information that is provided by a user.

In some embodiments, the various user interfaces described herein may be provided and/or presented as one or more user interfaces. For example, the user interfaces may be provided as single user interface and a user may scroll, browse, and/or otherwise scan the user interface. As another example, the user interfaces may be provided as subsequent windows, pages, screens, and/or boxes within a user interfaces. The user interfaces may also be provided as pop-windows and/or overlays. In some embodiments, the various systems, devices, and/or components described herein may generate, present, provide, and/or otherwise display at least one of the user interfaces described herein.

Figure 3:
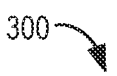
FIG. 3 depicts an example user interface that may provide confidence indication of one or more responses, according to an example embodiment.
Figure 3:
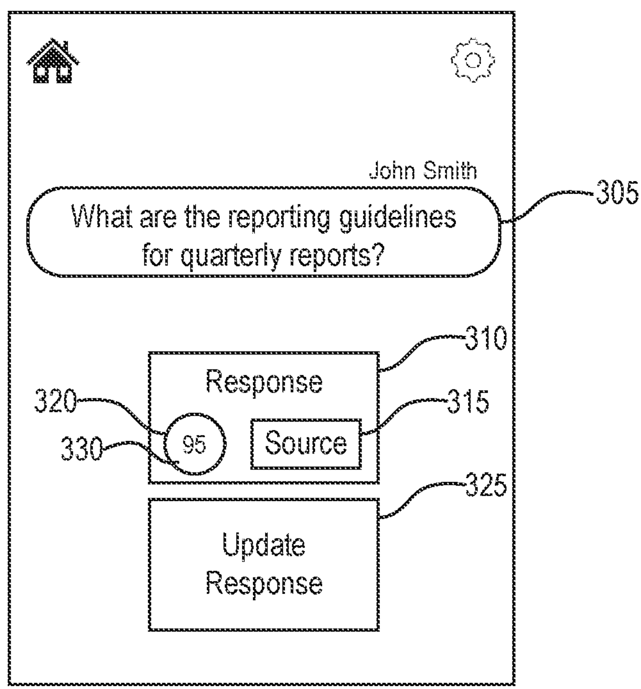

FIG. 3 depicts a user interface 300, according to some embodiments. In some embodiments, the user interface 300 may be displayed via the display device 144. For example, the display device 144 may display the user interface 300 responsive to receiving one or more signals from the interface 225. As another example, the client application 145 may cause the display device 144 to display the user interface. In some embodiments, the user interface 300 may be displayed responsive to the response generator 210 generating one or more responses. For example, the user interface 300 may be displayed responsive to the response generator 210 generating a response to a query.

In some embodiments, the user interface 300 may include at least one query 305, at least one response 310, and at least one element 325. The query 305 may refer to and/or include at least one of the various queries described herein. A user may provide or enter the query 305 by interfacing with, interacting with, or otherwise engaging with the user interface 300. In some embodiments, the query 305 may include a text box of a text field that is configured to receive and/or provide information.

In some embodiments, the response 310 may include at least one of the various responses described herein. For example, the response generator 210 may generate the response 310. In some embodiments, the response 310 may include a text field of a text box that is configured to receive and/or provide information. In other embodiments, the response 310 may include a pop-up window and/or an overlay.

In some embodiments, the element 325 may include at least one of a button, a selectable icon, a selectable element, or a clickable component. For example, the element 325 may be a button that can be selected by a user. In some embodiments, the response 310 may include at least one score 320 and at least one icon 315. The score 320 may refer to or include at least one of the various scores described herein. For example, the confidence generator 220 may generate the score 320. In some embodiments, the score 320 may include at least one graphical representation 330 or pattern 330. The graphical representation 330 may include at least one of various colors, various shapes, various sizes, or various arrangements.

In some embodiments, the graphical representation 330 may change and/or adjust based on a given level and/or given value. For example, the graphical representation 330 may include a first color based on a first score and the graphical representation 330 may include a second color based on a second score. As another example, portions and/or segments of a response may be color coded to provide confidence indications of different portions of the response. In this example, a first portion of a response that has a high confidence score may be displayed in a first color and a second portion of a response that has a low confidence score may be displayed in a second color. As even another example, the confidence generator 220 may evaluate one or more portions of a given responses and generate confidences for the portions (e.g., generate a confidence score for a first portion, a confidence score for a second portion, and so on and so forth).

As another example, a response may include one or more parts or portions. In this example, the response may include a first part and a second part. To continue this example, the first part and the second part may include links, that when selected, route a user to information used to generate the first part or the second part. Stated otherwise, a user may be provided with information used to generate one or more parts of the response and the user may review or analyze the information. As another example, the response may include portions that pertain to at least one of factual information (e.g., the capital of a given state is X) or inferred information (e.g., a given city receives X amount of snow). In this example, portions of a response that were generated based on factual information may be presented with a first color and portions of the response that were generated based on inferred information may be presented with a second color.

In some embodiments, the icon 315 may provide an indication of one or more sources. For example, the icon 315 may identify data sources that were used to generate the responses. In some embodiments, the icon 315 may include a link to view the data source and/or the information used to generate the responses.

In some embodiments, the interface 225 may receive one or more indications. For example, the interface 225 may receive indications of one or more selections on or in the user interface 300. For example, the interface 225 may receive an indication of a selection of the icon 325. In some embodiments, the interface 225 may receive an indication to generate one or more subsequent responses without an indication of scores. For example, the interface 225 may receive the indication responsive to a selection of the icon 325. In some embodiments, the interface 225 may communicate with the confidence generator 220 to provide an indication to generate the subsequent responses.

In some embodiments, the processing circuitry 150 may prevent generation of subsequent scores by providing data included in subsequent queries to the AI system 120 and then displaying responses generated by the AI system 120 without providing the responses to the confidence generator 220. For example, processing time and/or response times to given queries may be delayed (e.g., take longer) when a score is provided with one or more responses. Stated otherwise, responses that are provided without scores may be provided faster than responses that are generated with scores. As another example, a user may be limited to a number of responses that they may receive with scores (e.g., a subscription amount, monthly limit, licensing agreement, etc.).

In some embodiments, the interface 225 may receive one or more indications to generate subsequent responses to a given query. For example, the interface 225 may receive an indication to generate a subsequent response to a previously-provided query. In some embodiments, the indications may include or identify one or more sets of information to use when generating the subsequent responses. For example, the indication may identify a given data source to use when generating the response.

In some embodiments, the interface 225 may interface with the identified data sources to retrieve the identified sets of information. The interface 225 may provide the retrieved information to the response generator 210. In some embodiments, the response generator 210 may generate one or more subsequent responses based on the identified sets of information. In some embodiments, the interface 225 may transmit one or more signals to cause the client computing device 140 to display the subsequent responses. The interface 225 may also transmit one or more signals to cause the user interface 300 to display the subsequent responses. In some embodiments, the interface 225 may also transmit signals to cause the user interface 300 to include an element to indicate that the subsequent responses were generated with the identified sets of information.

Figure 4:
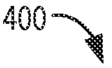
FIG. 4 depicts a flow diagram of a method to provide confidence indication of one or more responses, according to an example embodiment.
Figure 4:
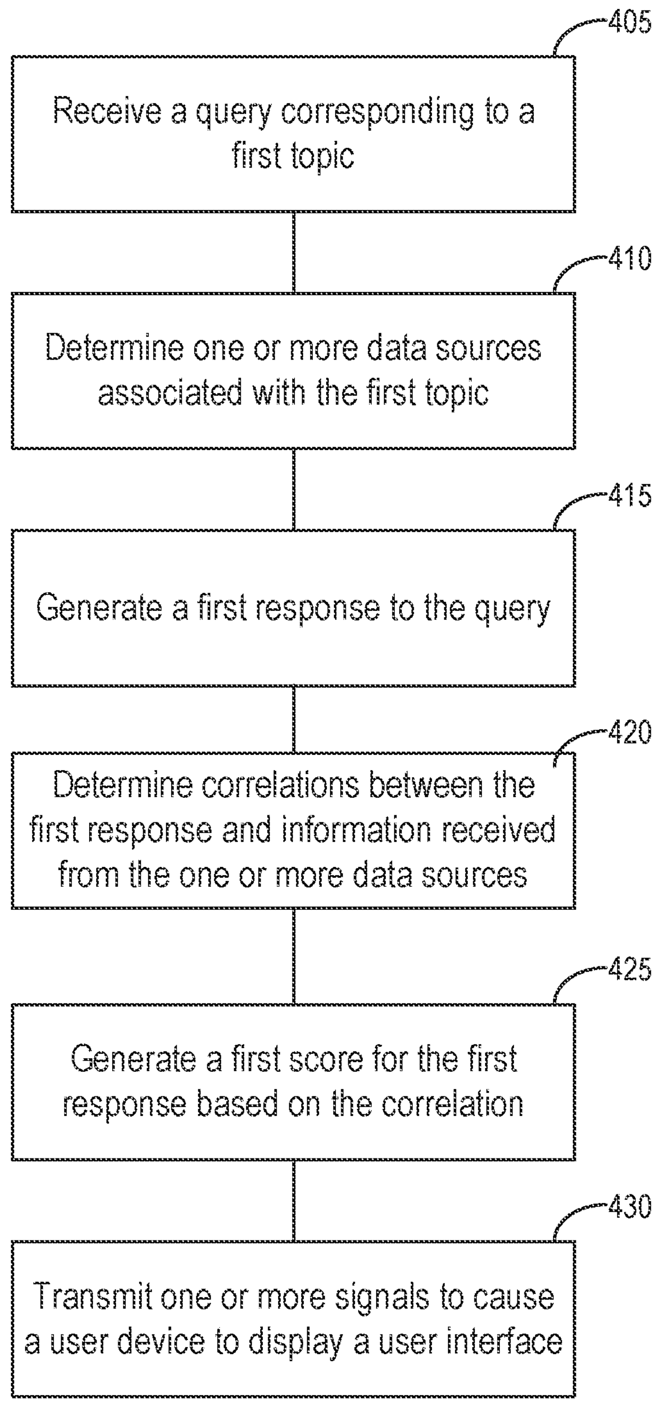

FIG. 4 depicts a flow diagram of a method 400 of providing one or more confidence indications for one or more responses, according to an example embodiment. Various components and/or systems of the provider computing system 110 can perform the method 400. Via the method 400, the provider computing system 110 may receive various queries from devices and the queries may pertain to one or more topics. The provider computing system 110 may also provide one or more scores for responses generated based on the queries. For example, the provider computing system 110 may transmit one or more signals to cause the client computing device 140 to display one or more user interfaces that include scores for responses generated by the AI system 120.

In step 405, a query corresponding to a first topic may be received. For example, the interface 225 may receive the query. In some embodiments, the interface 225 may receive the query from the client computing device 140. For example, the interface 225 may receive the query 305 from the client computing device 140. In some embodiments, the interface 225 may receive the query responsive to a user entering or providing information to a user interface. For example, the interface 225 may receive the query responsive to a user providing information in the user interface 300. In some embodiments, the query may include or indicate information and/or data sources to use in generating responses to the query.

In step 410, one or more data sources may be determined based on data included in the query. For example, the source engine 205 may determine data sources based on data included in the query received in step 405. In some embodiments, the source engine 205 may determine the data sources by identifying parameters included in the query. For example, the source engine 205 may identify parameters that pertain to a topic of the query. In some embodiments, the source engine 205 may communicate with the interface 225 to have the interface 225 communicate with the data sources.

In step 415, a first response to the query may be generated based on information received from the data sources. For example, the response generator 210 may generate one or more responses based on information received from the data sources determined in step 410. In some embodiments, the response generator 210 may implement or utilize the AI system 120 to generate the responses. For example, the response generator 210 may input the information into the AI system 120, and the AI system 120 may output the responses.

In step 420, a correlation between the first response and the information received from the data sources may be determined. For example, the correlation engine 215 may determine correlations between the first response generated in step 415 and the information received from the data sources in step 410. In some embodiments, the correlation engine 215 may determine the correlations based on relationships or associations between the responses and the information. For example, the correlation engine 215 may identify a first correlation based on the first response including information provided by the data sources.

In step 425, a first score to the first response may be generated based on the correlation. For example, the confidence generator 220 may generate a first score to the first response based on the correlation determined by the correlation engine 215. In some embodiments, the first score may indicate a confidence of the response generated by the response generator 210. For example, the confidence generator 220 may generate the first score based on associations between the first response and the information used to generate the first response. Stated otherwise, a role of the information in generating the response may impact or dictate the score of the response.

In step 430, one or more signals may be transmitted to cause a user device to display a user interface. For example, the interface 225 may transmit signals to the client computing device 140 to cause the display device 144 to display a user interface. In some embodiments, the user interface may include the first response and the first score. For example, the user interface may display or include information similar to that shown in user interface 300.

Figure 5:
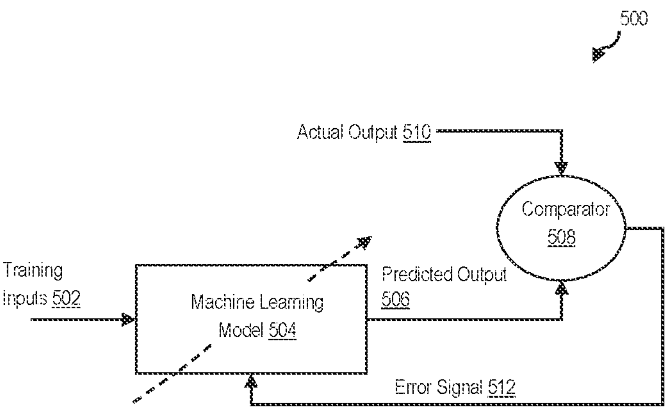
FIG. 5 depicts a block diagram of a system for supervised learning, according to an example embodiment.

Referring to FIG. 5, a block diagram of an example system 500 using supervised learning, is shown. Supervised learning is a method of training a machine learning model given input-output pairs. An input-output pair is an input with an associated known output (e.g., an expected output).

Machine learning model 504 may be trained on known input-output pairs such that the machine learning model 504 can learn how to predict known outputs given known inputs. Once the machine learning model 504 has learned how to predict known input-output pairs, the machine learning model 504 can operate on unknown inputs to predict an output. For example, the machine learning model 504 may learn to predict confidence scores for one or more outputs generated by the machine learning model 504.

The machine learning model 504 may be trained based on general data and/or granular data (e.g., data based on a specific user 532) such that the machine learning model 504 may be trained specific to a particular user 532.

Training inputs 502 and actual outputs 510 may be provided to the machine learning model 504. Training inputs 502 may include labeled datasets that correspond to events and actions taken to address the events. The training inputs 502 can also include prompts to provide to one or more users. For example, the training inputs 502 may include relationships between data integrity and one or more data sources (e.g., data sources that may have a higher reliability). As another example, the training inputs 502 may include datasets that include outputs that had confidence scores of various amounts.

The inputs 502 and actual outputs 510 may be received from the internal data source 170. The inputs 502 and the actual outputs 510 may be received from one of the various data repositories described herein. For example, the inputs 502 and the outputs 510 may be received from the third-party data source 130. Thus, the machine learning model 504 may be trained to predict at least one of events, actions, or sessions based on the training inputs 502 and actual outputs 510 used to train the machine learning model 504.

The system 500 may include one or more machine learning models 504. In an embodiment, a first machine learning model 504 may be trained to predict data for one or more events. For example, the first machine learning model 504 may use the training inputs 502 to predict outputs 506, by applying the current state of the first machine learning model 504 to the training inputs 502. The comparator 508 may compare the predicted outputs 506 to actual outputs 510 to determine an amount of error or differences. For example, the predicted event (e.g., predicted output 506) may be compared to the actual event (e.g., actual output 510).

In other embodiments, a second machine learning model 504 may be trained to make one or more recommendations to the user 532 based on the predicted output from the first machine learning model 504. For example, the second machine learning model 504 may use the training inputs 502 to predict outputs 506 by applying the current state of the second machine learning model 504 to the training inputs 502. The comparator 508 may compare the predicted outputs 506 to actual outputs 510 to determine an amount of error or differences.

In some embodiments, a single machine leaning model 504 may be trained to make one or more recommendations to the user 532 based on current user 532 data received from enterprise resources 528. That is, a single machine leaning model may be trained using the training inputs to predict outputs 506 by applying the current state of the machine learning model 504 to the training inputs 502. The comparator 508 may compare the predicted outputs 506 to actual outputs 510 to determine an amount of error or differences. The actual outputs 510 may be determined based on historic data associated with the recommendation to the user 532.

During training, the error (represented by error signal 512) determined by the comparator 508 may be used to adjust the weights in the machine learning model 504 such that the machine learning model 504 changes (or learns) over time. The machine learning model 504 may be trained using a backpropagation algorithm, for instance. The backpropagation algorithm operates by propagating the error signal 512. The error signal 512 may be calculated each iteration (e.g., each pair of training inputs 502 and associated actual outputs 510), batch and/or epoch, and propagated through the algorithmic weights in the machine learning model 504 such that the algorithmic weights adapt based on the amount of error. The error is minimized using a loss function. Non-limiting examples of loss functions may include the square error function, the root mean square error function, and/or the cross entropy error function.

The weighting coefficients of the machine learning model 504 may be tuned to reduce the amount of error, thereby minimizing the differences between (or otherwise converging) the predicted output 506 and the actual output 510. The machine learning model 504 may be trained until the error determined at the comparator 508 is within a certain threshold (or a threshold number of batches, epochs, or iterations have been reached). The trained machine learning model 504 and associated weighting coefficients may subsequently be stored in memory 516 or other data repository (e.g., a database) such that the machine learning model 504 may be employed on unknown data (e.g., not training inputs 502). Once trained and validated, the machine learning model 504 may be employed during a testing (or an inference phase). During testing, the machine learning model 504 may ingest unknown data to predict future data (e.g., actions, events, sessions, and the like).

Figure 6:
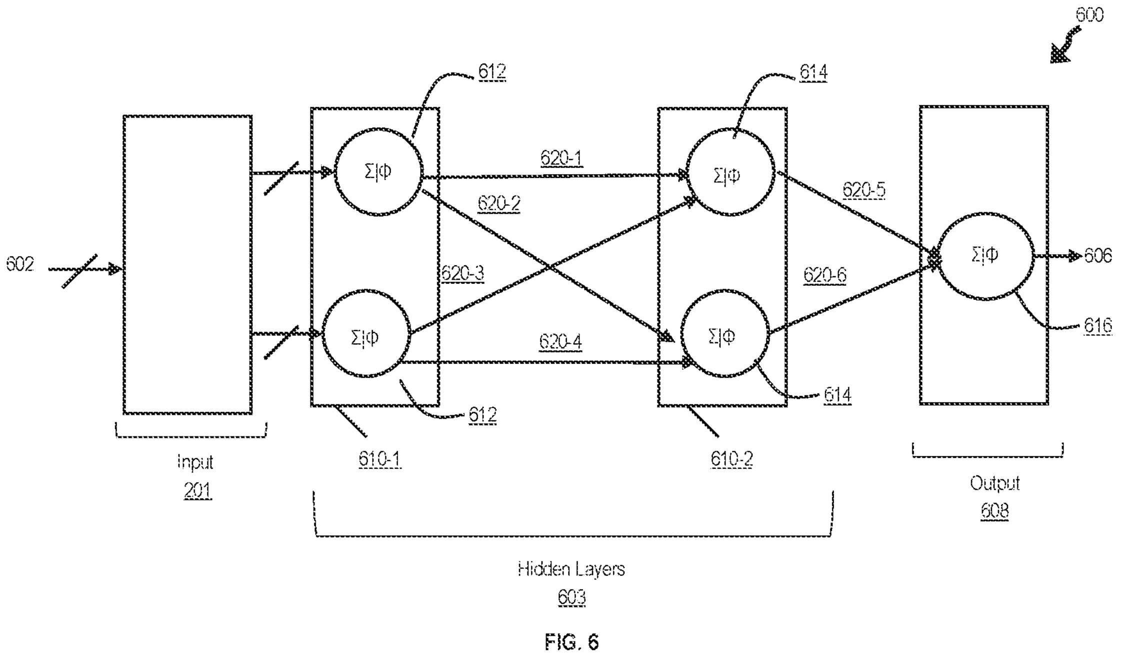
FIG. 6 depicts a block diagram of a simplified neural network model, according to an example embodiment.

Referring to FIG. 6, a block diagram of a simplified neural network model 600 is shown. The neural network model 600 may include a stack of distinct layers (vertically oriented) that transform a variable number of inputs 602 being ingested by an input layer 604, into an output 606 at the output layer 608.

The neural network model 600 may include a number of hidden layers 610 between the input layer 604 and output layer 608. Each hidden layer has a respective number of nodes (612, 614 and 616). In the neural network model 600, the first hidden layer 610-1 has nodes 612, and the second hidden layer 610-2 has nodes 614. The nodes 612 and 614 perform a particular computation and are interconnected to the nodes of adjacent layers (e.g., nodes 612 in the first hidden layer 610-1 are connected to nodes 614 in a second hidden layer 610-2, and nodes 614 in the second hidden layer 610-2 are connected to nodes 616 in the output layer 608). Each of the nodes (612, 614 and 616) sum up the values from adjacent nodes and apply an activation function, allowing the neural network model 600 to detect nonlinear patterns in the inputs 602. Each of the nodes (612, 614 and 616) are interconnected by weights 620-1, 620-2, 620-3, 620-4, 620-5, 620-6 (collectively referred to as weights 620). Weights 620 are tuned during training to adjust the strength of the node. The adjustment of the strength of the node facilitates the neural network's ability to predict an accurate output 606.

In some embodiments, the output 606 may be one or more numbers. For example, output 606 may be a vector of real numbers subsequently classified by any classifier. In one example, the real numbers may be input into a softmax classifier. A softmax classifier uses a softmax function, or a normalized exponential function, to transform an input of real numbers into a normalized probability distribution over predicted output classes. For example, the softmax classifier may indicate the probability of the output being in class A, B, C, etc. As, such the softmax classifier may be employed because of the classifier's ability to classify various classes. Other classifiers may be used to make other classifications. For example, the sigmoid function, makes binary determinations about the classification of one class (i.e., the output may be classified using label A or the output may not be classified using label A).

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud-based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud-based server). To that end, a "circuit" as described herein may include components that are distributed across one or more locations.

An exemplary system for implementing the overall system or portions of the embodiments might include a one or more computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general-purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes, and omissions may be made in the design, operating conditions and embodiment of the embodiments without departing from the scope of the present disclosure as expressed in the appended claims.

What is claimed is:

1. A provider computing system comprising:

at least one processing circuit having at least one processor coupled to at least one memory device, the at least one memory device storing instructions thereon that, when executed by the at least one processor, cause the at least one processing circuit to:

receive, from a user device, a query corresponding to a first topic;

determine, responsive to receipt of the query, one or more data sources associated with the first topic based on data included in the query;

receive, from the user device, a first set of information that identifies a data source of the one or more data sources having data associated with the query;

interface with the identified data source to retrieve the data associated with the query;

generate, using a machine learning model, a first response to the query based on information received from the identified data source including the data associated with the query;

determine, responsive to evaluation of the first response, a correlation between the first response generated using the machine learning model and the information received from the identified data source used to generate the first response;

generate a first score for the first response based on the correlation, the first score indicating a confidence of the first response generated using the machine learning model; and transmit one or more signals to cause the user device to display a user interface including the first response and the first score.

2. The provider computing system of claim 1, wherein the instructions further cause the at least one processing circuit to:

receive, from the user device, an indication to generate a second response to a second query without a second score that indicates a confidence of the second response; and prevent, responsive to receipt of the second query, generation of the second score by providing data included in the second query to the machine learning model and displaying the second response responsive to generation of the second response.

3. The provider computing system of claim 1, wherein the instructions further cause the at least one processing circuit to:

receive, responsive to displaying the user interface, an indication to generate a second response to the query, the indication including a first set of information to identify a data source having a second set of information to generate the second response;

interface, responsive to identification of the data source, with the data source to retrieve the second set of information; and generate, using the machine learning model, the second response based on the second set of information.

4. The provider computing system of claim 3, wherein the instructions further cause the at least one processing circuit to:

transmit one or more second signals to cause the user device to update the user interface to include the second response and an element to indicate that the second response was generated with the second set of information.

5. The provider computing system of claim 1, wherein the instructions further cause the at least one processing circuit to:

determine, responsive to receipt of the query, a credential associated with the user device;

identify, responsive to determination of the credential, one or more sets of information that are accessible based on the credential; and generate, using the machine learning model responsive to retrieval of the one or more sets of information, the first response based on the one or more sets of information.

6. The provider computing system of claim 1, wherein the instructions further cause the at least one processing circuit to:

generate, using the machine learning model based on the information received from the identified data source, a plurality of responses including the first response;

determine, responsive to generation of the plurality of responses, correlations between respective responses of the plurality of responses and the information received from the identified data source;

generate, based on the correlations, a plurality of scores for the plurality of responses, each of the plurality of scores associated with a respective response of the plurality of responses, wherein the plurality of scores include the first score, and each of the plurality of scores indicate a confidence of each respective response of the plurality of responses; and output, responsive to a determination that the first score exceeds a predetermined threshold, the first response.

7. The provider computing system of claim 1, wherein the user interface includes a graphical representation to indicate the first score, wherein the graphical representation includes at least one of an icon, a button, or an element, and wherein the graphical representation further includes an indication of data used to generate the first response.

8. The provider computing system of claim 1, wherein the machine learning model includes at least one of:

a Large Language Model;

a generative pre-trained transformer; or a generative artificial intelligence model.

9. A method, comprising:

receiving, by a provider computing system from a user device, a query corresponding to a first topic;

determining, by the provider computing system responsive to receipt of the query, one or more data sources associated with the first topic based on data included in the query;

receiving, by the provider computing system from the user device, a first set of information that identifies a data source of the one or more data sources having data associated with the query;

interfacing, by the provider computing system, with the identified data source to retrieve the data associated with the query;

generating, by the provider computing system using a machine learning model, a first response to the query based on information received from the identified data source including the data associated with the query;

determining, by the provider computing system responsive to evaluation of the first response, a correlation between the first response generated using the machine learning model and the information received from the identified data source used to generate the first response;

generating, by the provider computing system, a first score for the first response based on the correlation, the first score indicating a confidence of the first response generated using the machine learning model; and transmitting, by the provider computing system, one or more signals to cause the user device to display a user interface including the first response and the first score.

10. The method of claim 9, further comprising:

receiving, by the provider computing system from the user device, an indication to generate a second response to a second query without a second score that indicates a confidence of the second response; and preventing, by the provider computing system responsive to receipt of the second query, generation of the second score by providing data included in the second query to the machine learning model and displaying the second response responsive to generation of the second response.

11. The method of claim 9, further comprising:

receiving, by the provider computing system responsive to displaying the user interface, an indication to generate a second response to the query, the indication including a first set of information to identify a data source having a second set of information to generate the second response;

interfacing, by the provider computing system responsive to identification of the data source, with the data source to retrieve the second set of information; and generating, by the provider computing system using the machine learning model, the second response based on the second set of information.

12. The method of claim 11, further comprising:

transmitting, by the provider computing system, one or more second signals to cause the user device to update the user interface to include the second response and an element to indicate that the second response was generated with the second set of information.

13. The method of claim 9, further comprising:

determining, by the provider computing system responsive to receipt of the query, a credential associated with the user device;

identifying, by the provider computing system responsive to determination of the credential, one or more sets of information that are accessible based on the credential; and generating, by the provider computing system using the machine learning model responsive to retrieval of the one or more sets of information, the first response based on the one or more sets of information.

14. The method of claim 9, further comprising:

generating, by the provider computing system using the machine learning model based on the information received from the identified data source, a plurality of responses including the first response;

determining, by the provider computing system responsive to generation of the plurality of responses, correlations between respective responses of the plurality of responses and the information received from the identified data source;

generating, by the provider computing system based on the correlations, a plurality of scores for the plurality of responses, each of the plurality of scores associated with a respective response of the plurality of responses, wherein the plurality of scores include the first score, and each of the plurality of scores indicate a confidence of each respective response of the plurality of responses; and outputting, by the provider computing system responsive to a determination that the first score exceeds a predetermined threshold, the first response.

15. The method of claim 9, wherein the user interface includes a graphical representation to indicate the first score, wherein the graphical representation includes at least one of an icon, a button, or an element, and wherein the graphical representation further includes an indication of data used to generate the first response.

16. A non-transitory computer-readable storage media having instructions stored thereon that, when executed by at least one processor of a provider computing system, cause the provider computing system to perform operations comprising:

receiving, from a user device, a query corresponding to a first topic;

determining, responsive to receipt of the query, one or more data sources associated with the first topic based on data included in the query;

receiving, from the user device, a first set of information that identifies a data source of the one or more data sources having data associated with the query;

interfacing with the identified data source to retrieve the data associated with the query;

generating, using a machine learning model, a first response to the query based on information received from the identified data source including the data associated with the query;

determining, responsive to evaluation of the first response, a correlation between the first response generated using the machine learning model and the information received from the identified data source used to generate the first response;

generating a first score for the first response based on the correlation, the first score indicating a confidence of the first response; and transmitting one or more signals to cause the user device to display a user interface including the first response and the first score.

17. The non-transitory computer-readable storage media of claim 16, wherein the instructions, when executed by the at least one processor of the provider computing system, further cause the provider computing system to perform operations comprising:

receiving, from the user device, an indication to generate a second response to a second query without a second score that indicates a confidence of the second response; and preventing, responsive to receipt of the second query, generation of the second score by providing data included in the second query to the machine learning model and displaying the second response responsive to generation of the second response.

* * * * *